Aug. 30, 1938. S. M. MEYER Re. 20,842

HOSE COUPLING DRAIN

Original Filed Sept. 30, 1935

Inventor
Seth M. Meyer
By Young & Young
Attorneys

Reissued Aug. 30, 1938

Re. 20,842

UNITED STATES PATENT OFFICE 20,842

HOSE COUPLING DRAIN

Seth M. Meyer, West Bend, Wis.

Original No. 2,063,616, dated December 8, 1936, Serial No. 42,849, September 30, 1935. Application for reissue July 8, 1938, Serial No. 218,254

6 Claims. (Cl. 285—120)

This invention appertains to hoses, and more particularly to couplings of the type generally employed for fire hoses.

It is essential that after a hose has been used the water be drained therefrom, and hence the hose is generally hung up in a vertical position. However, the draining of all water from the hose is a difficult operation.

Therefore, one of the primary objects of my invention is to provide drain openings in the couplings to facilitate the flow of water from the hose before the same is uncoupled.

Another salient object of my invention is the provision of a hose coupling having drain ports in one section thereof, which are adapted to be uncovered when the sections of the coupling are slightly loosened, and fully covered against leakage when the sections are tightened to permit use of the hose.

A further object of my invention is the provision of a fire hose coupling embodying complementary sections for threaded connection with one another, one of the sections being provided with a sealing gasket and having radial lugs for facilitating the turning of the section provided with ways or ports communicating with the interior and exterior of the hose, the other section of the coupling being movable over the ports and in engagement with the gasket to tightly seal the coupling when the hose is in use, and to uncover said ports when the sections are slightly loosened to permit draining of the hose.

A still further object of my invention is to provide an improved hose coupling of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1:
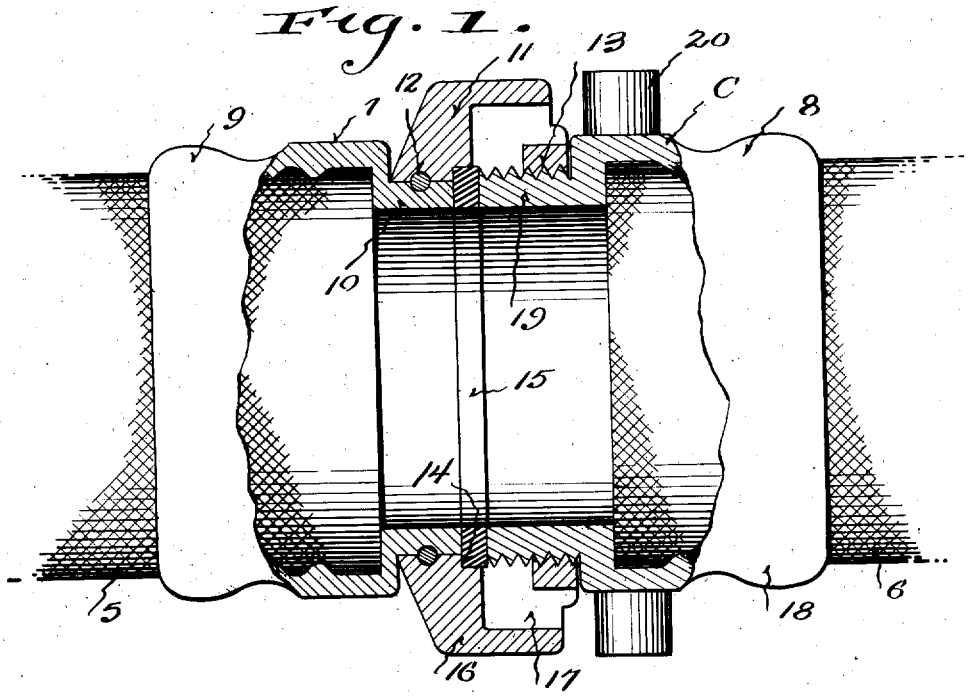
Figure 1 is a fragmentary side elevation of a fire hose showing adjacent lengths thereof connected by my improved coupling, the coupling being shown partly broken away and in section.
Figure 2:
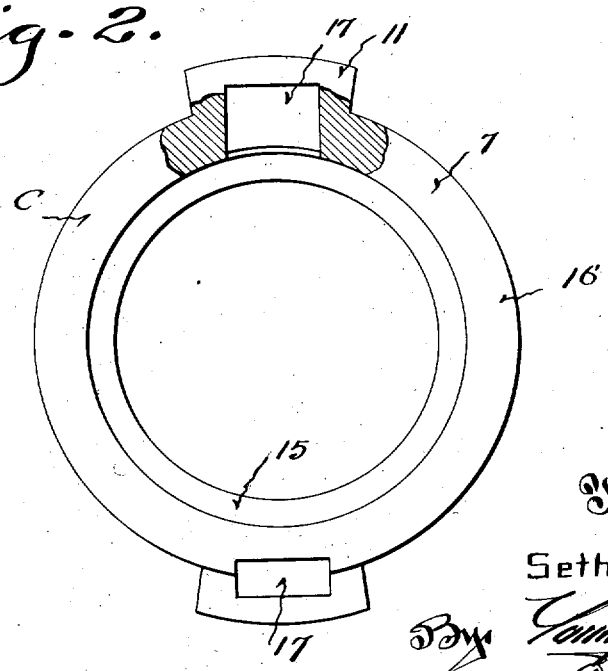
Figure 2 is a front elevation of the female section of the coupling, with parts thereof broken away and in section to illustrate the drain ports.

Referring to the drawing in detail, wherein similar reference characters designate corresponding parts throughout the several views, the letter C generally indicates my improved coupling for adjacent hose lengths 5 and 6. The coupling C includes companion sections 7 and 8, and the section 7 constitutes the female portion of the coupling, while the section 8 constitutes the male portion of the coupling.

The section 7 includes a sleeve 9 for receiving one end of the hose length 5, and the hose terminal can be secured in the sleeve in any desired manner. Formed on the forward end of the sleeve 9 is a reduced collar 10, on which is rotatably mounted the coupling nut 11. The coupling nut 11 is held on the collar 10 against accidental displacement by means of a split ring 12, which is received in annular recesses formed in the adjacent faces of the collar 10 and the coupling nut 11.

The inner face of the coupling nut 11 is internally threaded, as at 13, for receiving the male section 8, as will be later set forth. Inwardly of the threads 13, the coupling nut 11 is rabbeted to provide a shoulder 14 for receiving a sealing gasket 15.

The construction so far described is substantially standard, and in accordance with my invention I form on the coupling nut 11, at diametrically disposed points radially extending lugs 16, which can be utilized for facilitating the turning of the nut by a suitable tool.

Each of the lugs 16 has formed therein L-shaped or angular drain ports or passageways 17, and these ports or passageways communicate with the interior and the exterior of the coupling. The inner ends of the ports 17 are radial and communicate with the interior of the nut in advance of the gasket 15, for a purpose which will be later set forth. The outer ends of ports 17 are angled with respect to their inner ends and open out through the exterior of the coupling in a direction substantially perpendicular to a radius thereof, or substantially in a plane tangential to the exterior of said coupling.

The male section 8 of the coupling comprises a sleeve 18 for receiving the adjacent end of the hose length 6, and the terminal of the hose length is connected to the sleeve in any preferred manner. Formed on the forward end of the sleeve 8 is a reduced externally threaded collar 19, which is adapted to be received within the nut 11. The sleeve 18 can also have formed thereon radially extending cylindrical lugs 20 for the reception of a spanner wrench or the like to facilitate the turning of the coupling section 8.

In use of my improved invention, the sections 7 and 8 are united by means of the threaded nut 11, and the externally threaded collar 19, and the inner end of the externally threaded collar 19 snugly abuts against the gasket 15. This forms an efficient seal and prevents leakage of fluid between the coupling sections.

By referring to Figure 1, it will be noted that the externally threaded sleeve 19 closes the inner ends of the ports or passageways 17 when the said sleeve engages the gasket 15.

After the hose has been used and it is desired to drain the same, it is merely necessary to slightly separate the coupling sections 7 and 8 by turning the coupling nut 11. Only a few turns of the nut are necessary to loosen the sections and to permit the externally threaded collar 19 to move away from the gasket 15, and to uncover a part of the drain openings 17. This will allow the free flow of water from the hose at the couplings.

From the foregoing description, it can be seen that I have provided an efficient and simple means for easily permitting the draining of fire and other hoses.

Changes in details may be made without departing from the spirit or the scope of this invention, but what I claim as new is:

1. A coupling for hose for permitting the draining of water therefrom, comprising a female section including a rotatable nut, a sealing gasket in said nut, and radially extending lugs formed on the nut provided with drain passageways opening out through the exterior of the coupling and longitudinally thereof and communicating with the interior of the coupling in advance of the gasket, and a male section including a threaded collar for reception in said nut, the collar being adapted to close the drain openings and engage the sealing gasket when said sections are tightly coupled.

2. In a hose coupling, a female section including a sleeve for receiving a hose end having a reduced collar thereon, a coupling nut rotatably mounted on said collar, a gasket fitted in said nut against said reduced collar, radially extending lugs formed on the nut provided with drain passageways therein opening out through the inner sides of said lugs and longitudinally of the coupling and communicating with the interior of the nut in advance of the gasket.

3. A coupling for hose for permitting the draining of water therefrom, comprising a female section including a rotatable nut, a sealing gasket in said nut, and radially extending lugs formed on the nut provided with L-shaped drain passageways opening out through the exterior of the coupling in a direction substantially perpendicular to a radius thereof and communicating with the interior of the coupling in advance of the gasket, and a male section including a threaded collar for reception in said nut, the collar being adapted to close the drain openings and engage the sealing gasket when said sections are tightly coupled.

4. In a hose coupling, a female section including a sleeve for receiving a hose end having a reduced collar thereon, a coupling nut rotatably mounted on said collar, a gasket fitted in said nut against said reduced collar, radially extending lugs formed on the nut provided with angular drain passageways therein opening out through the inner sides of said lugs substantially in a plane tangential to the exterior of said coupling and communicating with the interior of the nut in advance of the gasket.

5. In a hose coupling having a female section including a sleeve for receiving a hose end and provided with a reduced collar, a coupling nut rotatably mounted on said collar, a gasket fitted in said nut against said reduced collar, said coupling nut being provided with a drain passageway communicating with the interior of the nut in advance of the gasket and opening out through the exterior of the coupling in a direction angular to a radius thereof.

6. In a hose coupling having a female section including a sleeve for receiving a hose end and provided with a reduced collar, a coupling nut rotatably mounted on said collar, a gasket fitted in said nut against said reduced collar, said coupling being provided with a drain passageway having an inner radial portion communicating with the interior of the nut in advance of the gasket and an outer angular portion opening out through the exterior of the coupling.

SETH M. MEYER.